United States Patent [19]

Ponnet

[11] 3,819,341

[45] June 25, 1974

[54] METHOD OF MANUFACTURING INTEGRATED MAGNETIC MEMORIES

[75] Inventor: Robert Ponnet, Antony, France

[73] Assignee: Thomson-CSF, Paris, France

[22] Filed: Nov. 17, 1972

[21] Appl. No.: 307,526

[30] Foreign Application Priority Data

Nov. 23, 1971 France .............................. 71.41841

[52] U.S. Cl. ............... 29/604, 29/625, 340/174 TF, 340/174 MA

[51] Int. Cl. .............................................. H01f 7/06

[58] Field of Search ............. 29/604, 625; 174/68.5; 340/174 MA, 174 TF, 174 JA

[56] References Cited

UNITED STATES PATENTS

| | | | |
|---|---|---|---|
| 3,566,461 | 3/1971 | Carbonel | 29/604 |
| 3,583,066 | 6/1971 | Carbonel | 29/604 |
| 3,611,558 | 10/1971 | Carbonel | 29/604 |

*Primary Examiner*—Charles W. Lanham
*Assistant Examiner*—Carl E. Hall
*Attorney, Agent, or Firm*—Cushman, Darby & Cushman

[57] ABSTRACT

A method for manufacturing integrated magnetic memories, including a ferromagnetic plate with an aperture through which extend the associated conductors, comprises essentially the steps of depositing upon a metal substrate of a succession of first layer of copper and a second layer of ferromagnetic material according to an appropriate pattern; the substrate zone where the conductors are to be extended through said plate being protected by resin; exposition of said resin, laying bare said substrate zones; depositing a third layer of said copper; detaching the copper-ferromagnetic material plate thus realized from said substrate; depositing conductors; removing said copper and filling all the interstices thus created with an insulating material.

3 Claims, 6 Drawing Figures

METHOD OF MANUFACTURING INTEGRATED MAGNETIC MEMORIES

The present invention relates to a novel method for manufacturing integrated magnetic memories and a memory plane thus produced.

The invention relates more particularly to the production of integrated magnetic elements comprising a laminated structure of thin ferromagnetic alloy or "permalloy" films electrically insulated from one another by insulating films. These thin films are generally deposited by electrolysis upon a support metal which is subsequently dissolved by chemical attack and replaced in a later step, by the insulating films.

One of the problems encountered in using this kind of manufacturing technology, is the production of passages for the various conductors. This is a delicate operation because the etching agents used and the etching speeds, differ for the support metal, the copper for example, and for the ferromagnetic material.

According to the present invention, there is provided a method for manufacturing integrated magnetic memories, including a plate of ferromagnetic material and at least one conductor extending through said plate comprising the following steps:

- depositing upon a first metal substrate, a photosensitive resin layer;
- exposing said resin through an appropriate mask, thus laying bare parts of said substrate, the remaining parts of said substrate being protected by said resin, said remaining substrate parts forming zones where said conductor is to be extended through said plate;
- depositing successively, on the first bared zones of said substrate, of a first layer of a support metal which is easily etchable by predetermined chemical agents, and a second layer of said ferromagnetic material, resisting to said agents,
- exposing the resin, thus laying bare second zones of said substrate;
- depositing on said second bared zones of a third layer of said metal easily etchable by said agents;
- removing said metal-ferromagnetic material plate, thus formed from said substrate;
- depositing a second resin layer on both faces of said metal-ferromagnetic material plate;
- depositing at least said conductor;
- removing said support metal and filling all the interstices thus created with an insulating material.

For a better understanding of the invention, and to show how the same may be carried into effect, reference will be made to the drawing appended to the ensuing description and in which.

Similar elements carry similar references, in all the figures.

Figure 1:
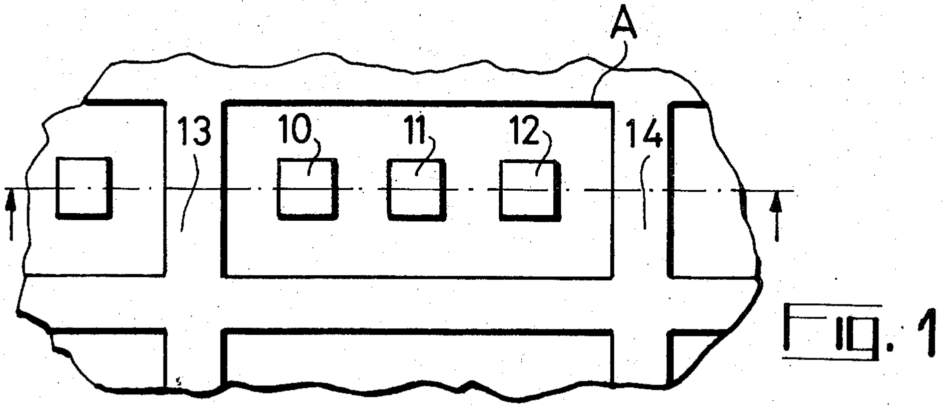
FIG. 1 is a plan view of a schematic illustration of the magnetic element which is to be produced in the final step.

FIG. 1 schematically illustrates a mask which is a replica of the surface of a memory plane. In fact, one element only has been illustrated on FIG. 1, but a large number of identical elements are manufactured simultaneously according to the method; the neighbours of this element A, simply have been sketched. The element A (as well as the other elements), comprises three windows 10, 11 and 12. The spaces separating the element A from its neighbours are marked 13 and 14.

When the memory is completed, it will comprise a complete wiring network, not shown, constituted by conductive films passing through the holes of various elements via the windows 10, 11, 12. These conductors, in the case of magnetic memories will be used to write in and read out the information stored in the various elements.

A sequence of operations in accordance with the invention makes it possible to delimit these windows and the conductor passages, before the elements themselves are created, this very much simplifying the implementation of magnetic memories of this kind.

This sequence of operations is illustrated by FIGS. 2 to 6, each of these corresponding to the manufacturing steps in accordance with the invention. The sequence of operations is included into the range of operations employed in the manufacre of integrated memories as set out in the U.S. Pat. No. 3,566,461.

Figure 2:
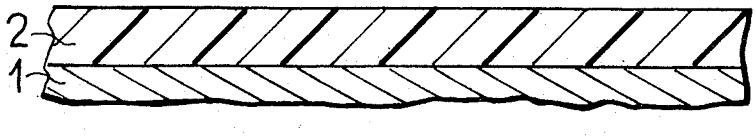
FIGS. 2 to 6 illustrate different steps of the method according to the invention.

The first step is schematically illustrated in FIG. 2. A substrate 1 of suitable material such as stainless steel, for example, is covered over the whole of its surface with a layer of photosensitive resin 2 of a kind which can be eliminated after it has been exposed.

Figure 3:
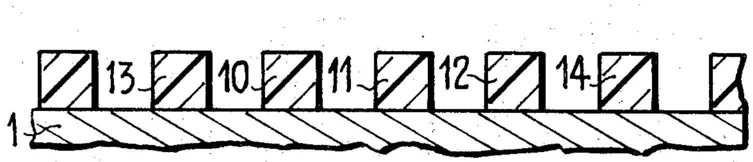

The second step is schematically illustrated in FIG. 3, this resin layer has been exposed through a mask in accordance with FIG. 1. Profiles of the windows 10, 11, 12 and the passages 13 and 14 delimit the opaque zones of said mask. The resin is therefore left behind at these zones which can be seen in the figure in the form of cross-hatched areas.

Figure 4:
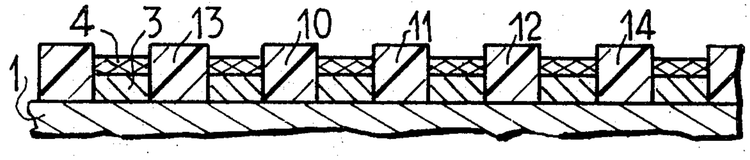

The third step is schematically illustrated on FIG. 4. On those areas of the substrate 1 which have been bared during the preceding step there are successively deposited for example by electrolysis, a layer 3 of copper acting as the support metal and a layer 4 of permalloy.

Figure 5:
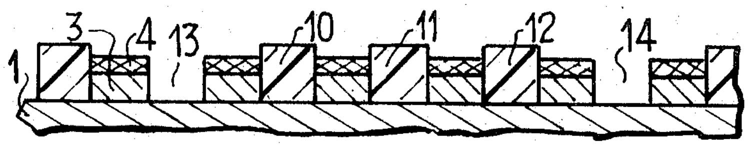

The fourth step is schematically illustrated in FIG. 5. A second exposure of the layer 2 left after said second step, is effected through a second mask containing substantially the pattern of the mask shown in FIG. 1, but whose windows 10, 11 and 12 are, in this occasion, the only opaque portions, the portions 13 and 14 being transparent instead. In practice, the windows 10, 11 and 12 can be substantially larger than those in the first mask, enabling highly accurate photographic positioning to be achieved.

It is simply necessary for the second mask used in this operation to conceal the windows 10, 11 and 12 without overlapping the passages 13, 14, and this is something which can readily be achieved. The resin is then eliminated at the passages 13 and 14 where the substrate is again bared.

It is left behind in the windows 10, 11 and 12.

Figure 6:
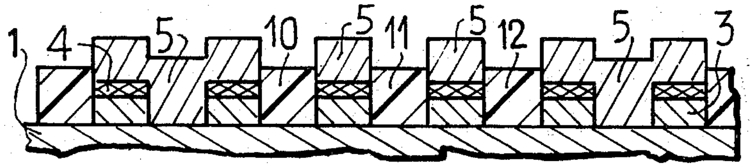

The fifth step is schematically illustrated in FIG. 6. A second copper layer 5 is deposited over all the visible metal parts. The object of this, is to act as a support for the pattern of conductors which will be deposited subsequently in the course of operation described in the aforesaid cited patent.

After the execution of said fifth step, the sequence of operations in accordance with the invention is complete. The locations of the conductor passages now exist. They have been produced without any chemical attack, through a single application of resin and using equipment for the exposure of said resin which does not require extreme accuracy of positioning.

The copper-permalloy plate, after having been detached from the substrate 1, is ready to undergo the succession of wiring operations in accordance with the known methods described in the cited U.S. Patent:

deposition of a resin layer on both faces of the plate,
exposure of said resin in accordance with the wiring scheme,
deposition of conductor films,
elimination of the copper and filling of all the interstices thus created with a flexible insulating varnish.

Without departing from the scope of the invention, it is possible to use a photosensitive resin which, instead of being eliminated as in the example described, at the exposed zone, is eliminated instead at the non-exposed zones.

What I claim is:

1. A method of manufacturing an integrated magnetic memory, constituted by elements, each element including a plate of ferro-magnetic material comprising at least one window; at least one conductor extending through said window of said plate; spaces separating each element from one another; said method comprising the following steps;

depositing upon a first metal substrate, a first photosensitive resin layer;

exposing and developing said first resin through a first appropriate mask having first opaque zones corresponding to said windows and to said spaces, thus laying bare first parts of said substrate, the remaining parts of said substrate being protected by first resin portions which have not been exposed, thus laying protected said remaining parts of said substrate behind said first opaque zones;

depositing successively on said first parts a first metallic layer constituting a removable support made of metal which is easily etchable by predetermined chemical agents, and upon said support a second layer of said ferromagnetic material, resisting to said agents;

exposing and developing through a second mask having second opaque zones corresponding to said windows, parts of said first resin portions, thus laying bare second zones of said substrate;

depositing on said second zones and on said ferromagnetic layer, a third layer of said metal easily etchable by said agents;

removing the metal-ferromagnetic material plate, thus formed and further comprising said first resin layer non exposed during exposing through said first and second mask and corresponding to said windows, from said substrate;

depositing a second resin layer on both faces of said metal-ferromagnetic material plate and on said non exposed resin corresponding to said windows;

exposing said second resin layer through a third mask corresponding to the wiring scheme of said conductors, said third mask comprising at least transparent zones corresponding to said windows, developing for eliminating said first and second resin layer exposed through said transparent zones of said third mask to form said windows;

depositing at least one of said conductors through said windows;

removing said removable support by said chemical agent and filling all the interstices thus created with an insulating material.

2. A method as claimed in claim 1, wherein said substrate is made of stainless steel.

3. A method as claimed in claim 1, wherein said easily etchable metal is made of copper.

* * * * *